United States Patent
White et al.

(10) Patent No.: US 6,419,077 B1
(45) Date of Patent: Jul. 16, 2002

(54) AUTOMATED TRANSFER STATION FOR HANGING ARTICLES SUCH AS PEPPERONI SAUSAGES

(75) Inventors: James E. White, South Hutchinson; Gregory A. Roepka, Hutchinson, both of KS (US)

(73) Assignee: Stainless Steel Systems, Inc., South Hutchinson, KS (US)

( * ) Notice: Subject to any disclaimer, the term of this patent is extended or adjusted under 35 U.S.C. 154(b) by 0 days.

(21) Appl. No.: 09/837,021

(22) Filed: Apr. 18, 2001

(51) Int. Cl.[7] .............................................. B65G 47/34
(52) U.S. Cl. ................. 198/468.6; 198/433; 198/486.1; 198/465.4; 452/182; 452/183
(58) Field of Search ........................... 198/465.4, 468.6, 198/486.1, 433, 680; 452/182, 183

(56) References Cited

U.S. PATENT DOCUMENTS 3,430,754 A * 3/1969 Meseke et al. .......... 198/486.1
5,664,659 A * 9/1997 Gaertner ................... 198/465.4
6,080,055 A   6/2000 Leining et al.
6,277,018 B1 * 8/2001 Cody et al. ................. 452/182

* cited by examiner

Primary Examiner—Joseph E. Valenza
(74) Attorney, Agent, or Firm—Shughart Thomson & Kilroy P.C.

(57) ABSTRACT

A sausage transfer station is disclosed for transferring sausages from a rack where they are hung by respective string loops in a plurality of rows to a main conveyor. The transfer station includes an unload conveyor for advancing the rack forward, a selectively pivotable unloader shaft oriented transversely to the unload conveyor, and a transfer conveyor having a leg parallel to the unloader shaft and an apex proximate the main conveyor. The unloader shaft has a plurality of unloader fingers extending transversely outward therefrom. The unloader fingers engage the string loops of a row of sausages to push them off of the rack and then drop them onto respective fingers of the transfer conveyor. The sausages are carried by the transfer conveyor to the apex proximate the main conveyor where they are transferred to hooks on the main conveyor.

24 Claims, 6 Drawing Sheets

AUTOMATED TRANSFER STATION FOR HANGING ARTICLES SUCH AS PEPPERONI SAUSAGES

BACKGROUND OF THE INVENTION

1. Field of the Invention

This invention relates to a station for an processing line which automatically picks sequential rows of items hanging by respective loops, such as pepperoni sausages, off of a rack from which they have been suspended and transfers the items to a conveyor.

2. Description of the Related Art

Pepperoni and other dry sausages are produced by stuffing meat, seasonings, curing salts, and a starter mixture of selected bacteria into a casing which was traditionally made of animal intestine. Today, the casings are more typically made of a synthetic material. The casing is closed at each end either by tying or by a metal clip and has a loop of string secured to the upper end for supporting the sausage from a hook or the like. After the sausages have been stuffed, they are hung from their string loops on racks and placed in a fermentation room where the bacteria produce lactic acid. It is the presence of this lactic acid, in addition to the seasonings, which gives the sausage its familiar tangy flavor. After fermentation, the racks of sausages are moved to a drying room where they remain for several weeks until the proper water content is reached.

Pepperoni is most often used in sliced form on pizza, in sandwiches and salads, and in other foods. Commercial pepperoni producers slice and package the pepperoni in bulk for use in preparing these food items. Before the pepperoni can be sliced, however, the sausage must first be removed from the casing, which is inedible. Modern synthetic casings are reusable and therefore it is advantageous to remove the casings from the pepperoni in such a manner that the casings are not damaged.

Traditional processes for removing pepperoni sausages from their casings and slicing the pepperoni are very labor intensive. In one such method, the sausages are brought into a processing area on their drying racks, usually by means of a forklift. Each sausage is then manually removed from the rack. A worker then takes a sausage and inserts a probe connected to an air hose into one end of the casing. The worker partially inflates the casing, causing the casing to begin to separate from the pepperoni. By "massaging" the sausage between his hands, the worker moves the air around inside the casing, forcing the air between the casing and the pepperoni, and thereby completes the separation process. The worker then cuts off the tie or clip. The casing can then be pulled off of the pepperoni. The worker then places the pepperoni in a bin which is transported by a forklift to a slicing station. The pepperoni are then manually removed from the bin and placed in a slicer.

In today's market, increased demand for sliced pepperoni for use on pizzas and escalating labor costs have made inefficient manual handling and casing removal techniques undesirable. Systems have been developed for automatically striping casings from pepperoni sausages. One such machine is disclosed by U.S. Pat. No. 6,080,055 issued to Lyndon R. Leining et al. and entitled "Method and Apparatus for Stripping Cases From Sausages." In this device, pepperoni sausages are manually placed on an indexing conveyor which moves the sausages two at a time through a series of stations. At the first station, air is injected into the sides of the casings proximate each end thereof At the second station, the casings are scored along a transverse line near each end, defining an end cap, and each end cap is pulled off. At the third station, a longitudinal cut is made down the length of each casing. At the fourth station, gripping fingers grab the casing and pull it off the sausage.

While this machine is capable of automatically removing the casings from pepperoni, the casings are destroyed in the process and cannot be reused. Furthermore, the machine processes the pepperoni sausages in a generally horizontal alignment and it appears that the sausages are manually placed on the machine. There remains a need for a machine which can be used to automatically transfer pepperoni sausages hanging from a loop in a generally vertical alignment to a conveyor assembly or line while maintaining the vertical alignment.

SUMMARY OF THE INVENTION

The present invention comprises a sausage transfer station for transferring sausages from a rack to a main conveyor. The sausages are initially suspended from the rack in a plurality of rows, each sausage in each row being hung from the rack by a respective loop of string attached to the sausage and entwined over a hook depending from the rack.

The transfer station includes an unload conveyor which carries the rack through the transfer station and selectively advances the rack forward. A selectively pivotable unloader shaft having a number of unloader fingers equal to the number of sausages in each row is oriented transversely to the path of the unload conveyor and parallel to the rows of sausages. Each unloader finger has a barb proximate its distal end and a pair of shoulders intermediate the proximate and distal ends. The transfer station further includes a transfer conveyor having a plurality of conveyor fingers equally spaced with the unloader fingers. The transfer conveyor runs in a generally triangular loop and has a first leg positioned below the unloader shaft and running generally parallel thereto. An apex of the transfer conveyor is positioned in close proximity to the main conveyor.

As the rack advances forward with the unload conveyor, the loops of string attached to the sausages in a row are pulled or advanced over respective unloader fingers until the loops engage the shoulders of the unloader fingers. While the rack continues to advance, the abutment of the loops against the shoulders of the unloader fingers pushes the loops off of the hooks. Simultaneously, the unloader shaft pivots in an upward direction to catch the ends of the string loops as they come off of the hooks, leaving the sausages suspended from the unloader fingers. The unloader shaft then pivots downwardly until the unloader fingers are in a generally vertical or slightly angled orientation with the sausages hanging from the barbs thereon. The unloader shaft remains in this position for a delay period during which the sausages from the previous row clear the first leg of the transfer conveyor. After the delay period, the unloader shaft is pivoted rearwardly until the string loops of the sausages are engaged by respective conveyor fingers and pulled off of the barbs and onto the conveyor fingers. The unloader shaft is then pivoted back into its initial position in preparation for unloading the next row of sausages.

Once on the conveyor fingers, the sausages continue along the path of the transfer conveyor until they reach the apex thereof proximate the main conveyor. At the apex, the strings of the sausages are sequentially advanced across a plate having an outwardly inclined edge which pushes the strings off of the conveyor fingers. After being pushed off of its respective conveyor finger, each of the string loops is captured by a hook on the main conveyor. The sausages then travel along the main conveyor toward the casing disengaging station.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain objects and advantages of this invention will become apparent from the following description taken in conjunction with the accompanying drawings wherein are set forth, by way of illustration and example, certain embodiments of the invention.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
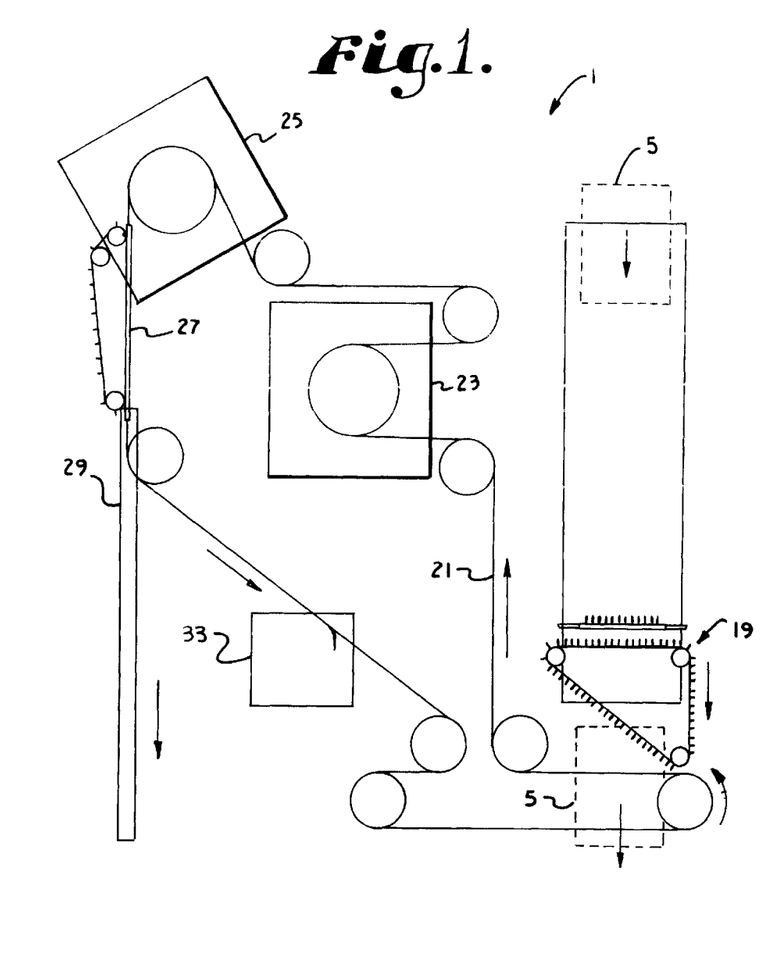
FIG. 1 is a schematic diagram of a sausage processing line.
Figure 2:
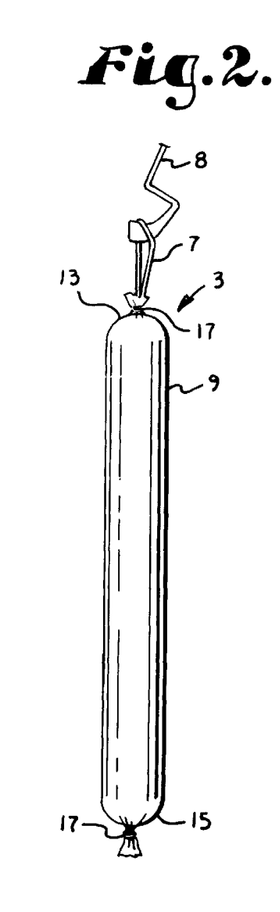
FIG. 2 is a perspective view of a pepperoni sausage suspended on a rack hook.

Referring to the drawings in more detail, and in particular to FIG. 1, the reference number 1 generally designates a pepperoni processing line having a plurality of processing stations. Pepperoni sausages 3 are brought onto the processing line 1 on racks or trees 5 where they are suspended by respective loops of string 7 on hooks 8. Each rack has a plurality of rows of hooks 8, typically fifteen rows with twelve hooks per row. The sausages 3 are encased in casings 9 closed at their top ends 13 and bottom ends 15 by clips 17. The string loops 7 are held in place by the upper clips 17. The rows of sausages 3 are automatically and sequentially removed from the trees 5 at a transfer station 19 and placed in line on an overhead conveyor 21 such that a succession of sausages 3 are moveably suspended from the conveyor 21 by their respective loops of string 7. The conveyor 21 carries the sausages 3 to a casing disengaging station 23 where the casings 9 are loosened from the sausages 3 in preparation for their removal.

From the disengaging station 23, the conveyor 21 carries the sausages 3 to an end cutting station 25 where the casings 9 are cut just above the lower clip 17, opening the bottom end 15 of the casing 9. From the end cutting station 25, the sausages 3 move along the conveyor 21 to a casing stripping station 27 where the sausages 3 are removed from the casings 9 through the respective open bottom ends 15. The sausages 3 drop out of the casings 9 and onto a high speed conveyor belt 29 which transports them to a slicing station (not shown) where they are sliced for subsequent packaging and use. The casings 9 continue along the conveyor 21 to a holding bin 33 where they are collected. The casing removal process herein described leaves the casings 9 essentially intact, except for a portion of the lower end which is removed, so that they can be cleaned and reused in the production of more sausages 3.

Figure 3:
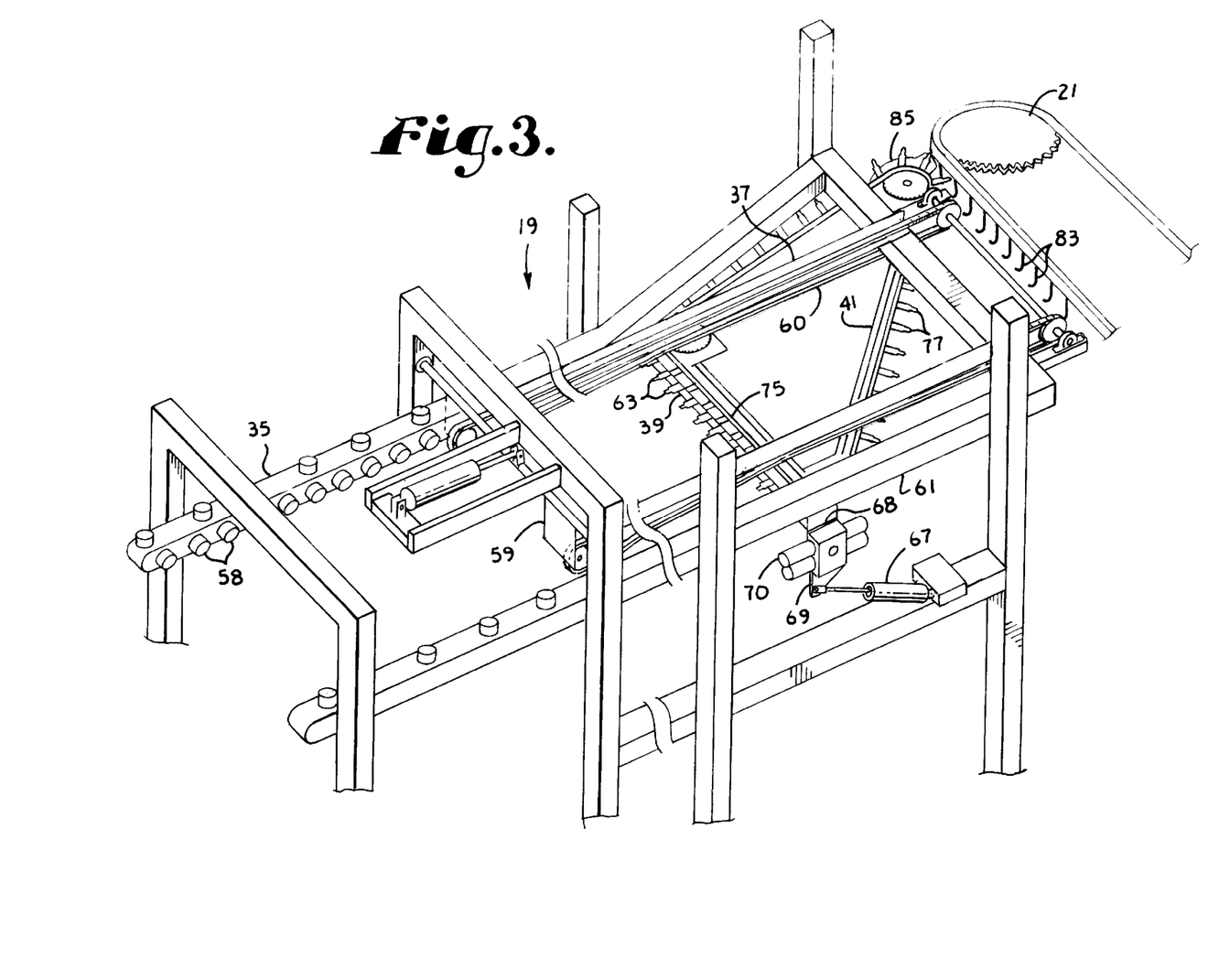
FIG. 3 is a simplified perspective view of the automated pepperoni transfer station.

Referring to FIG. 3, the transfer station 19 provides an automated means for transferring pepperoni sausages from the drying racks 5 to the main conveyor 21 for transport through the casing disengaging station 23 and cutting station 25. The transfer station 19 generally comprises: a gravity roller conveyor 35 upon which racks 5 of sausages 3 are placed by a forklift (not shown); a powered unload conveyor 37 for moving the racks 5 from the roller conveyor 35 through the transfer station 19; a pivoting unloader shaft 39 for picking the rows of sausages 3 off of the racks 5; and a transfer conveyor 41 for receiving the sausages 3 from the unloader shaft 39 and delivering them to the main conveyor 21. Operation of the transfer station 19 is controlled by a programable logic controller (not shown).

Figure 4:
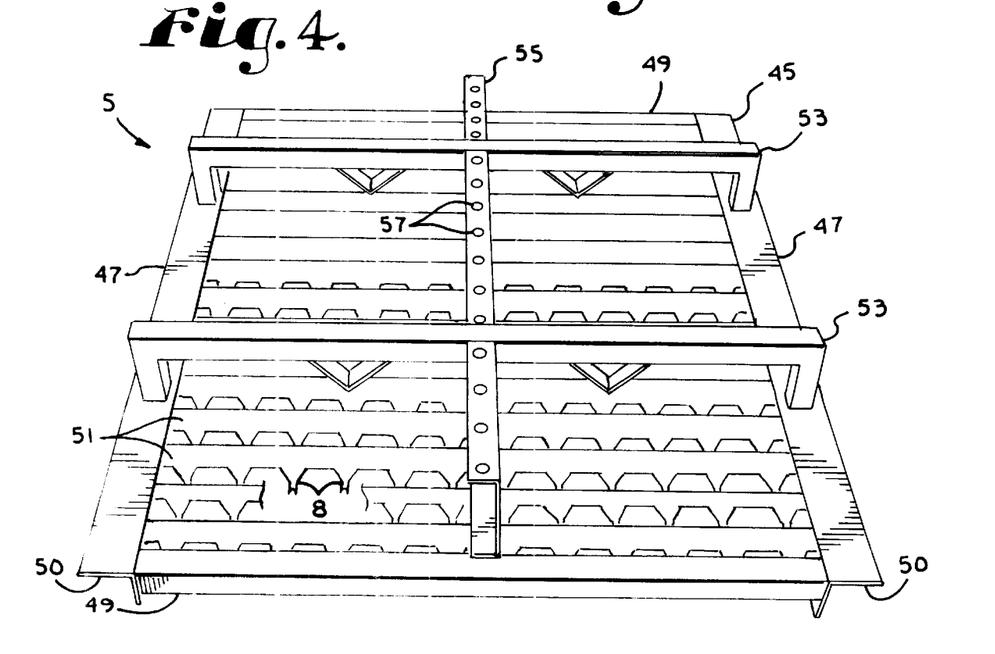
FIG. 4 is a perspective view of a pepperoni rack.

Referring to FIG. 4, each of the racks 5 comprises a generally rectangular frame 45 having a pair of longitudinal side rails 47, and a pair of transverse front and back rails 49. Each of the side rails 47 has an outwardly extending flange 50 for engaging the conveyors 35 and 37. A plurality of crossbars 51 (fifteen shown) extend laterally across the frame 45 between the side rails 47. The crossbars 51 are equally spaced apart from each other.

A plurality of the hooks 8 (twelve shown), from which the sausages 3 are suspended by their respective string loops 7, depend from each of the crossbars 51. The number of hooks 8 on each of the crossbars 51 determines how many sausages 3 will be included in a row, and therefore how many sausages 3 will be transferred from the rack 5 by the transfer station 19 at one time. The hooks 8 are preferably formed into uniform dimensions and equally spaced apart from each other along the crossbars 51. The hooks 8 are pointed rearwardly relative to the direction of travel of the racks 5. The end of each hook 8 is saddle shaped to spread apart the legs of the string loops 7, to facilitate removal of the sausages 3 from the hooks 8.

Each rack 5 further includes a pair of transverse lifting bars 53 spaced upwardly from the frame 45 by which the rack 5 is supported when carried by the forklift. A longitudinal center bar 55 runs the length of the rack 5 and includes a plurality of locating holes 57, each of which corresponds to one of the crossbars 51. The locating holes 57 are sensed by proximity sensors (not shown) which provide feedback to the programable logic controller so that the controller can ascertain the locations of the crossbars 51 and properly control the movement of the rack 5 along the unload conveyor 37 during the transfer process.

Referring again to FIG. 3, the roller conveyor 35 generally comprises two rows of closely spaced and rotatably mounted rollers 58 which slope downwardly from a rack loading end thereof toward the unload conveyor 37. The rows of rollers 58 are spaced apart from each other a sufficient distance that each of the flanges 50 of the rack side rails 47 can each ride on a respective row of rollers 58. A pneumatically operated stop 59 is located at the bottom of the roller conveyor 35 to selectively control passage of the racks 5 from the roller conveyor 35 onto the unload conveyor 37.

The unload conveyor 37 comprises a pair of mechanically driven chains 60 which are aligned with the rows of rollers 58 so as to also engage the flanges 50 of the racks 5. The motor (not shown) which drives the chains 50 is controlled by the programable logic controller so that the racks 5 can be advanced forward with precise timing necessary for the transfer process. In a preferred embodiment, the unload conveyor 37 is constantly moving, but its speed is varied by the controller in order to time the movement of the racks 5 relative to the motion of the unloader 39. It is foreseen, however, that the unload conveyor 37 could also be designed to either index the racks 5 forward at the proper intervals, or to operate at a constant speed precisely timed to match the motion of the unloader shaft 39.

Figure 5:
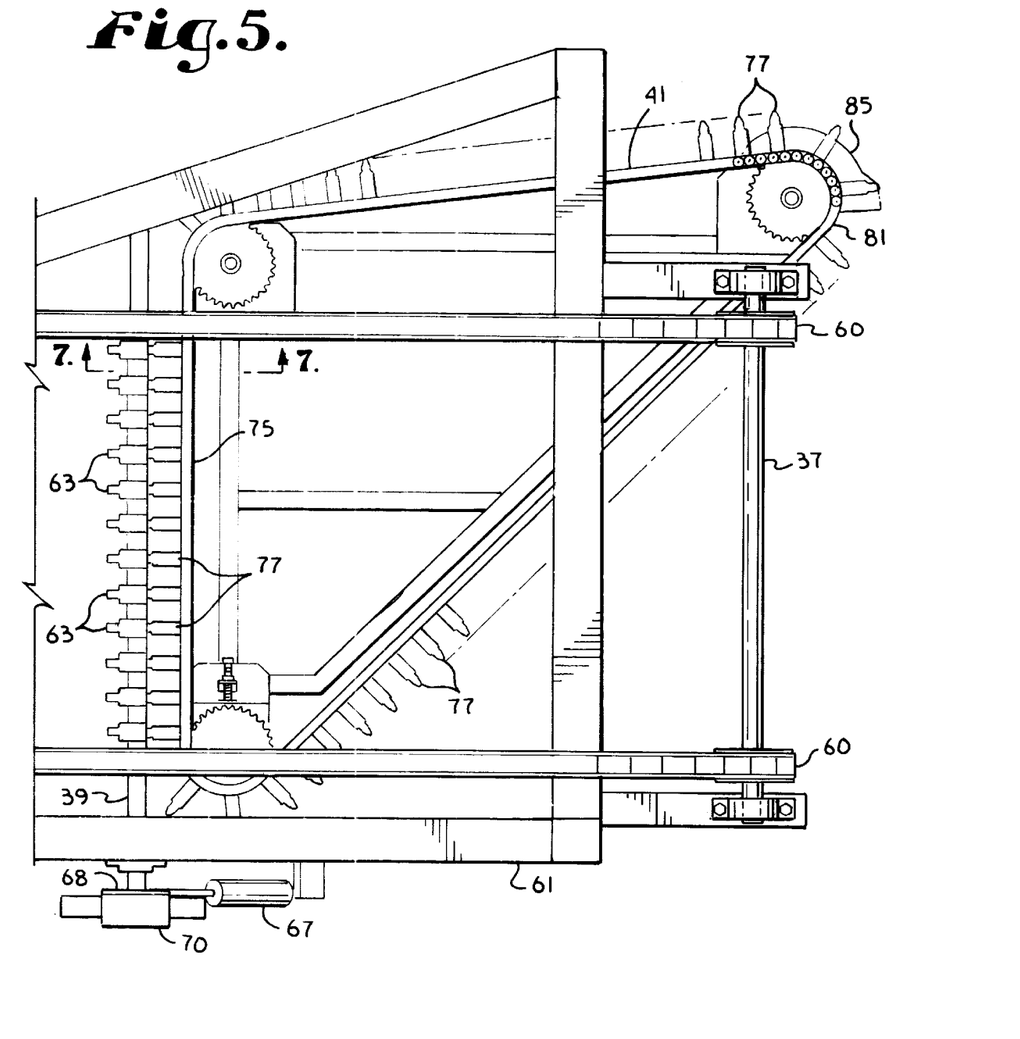
FIG. 5 is a partial top view of the automated pepperoni transfer station.
Figure 6:
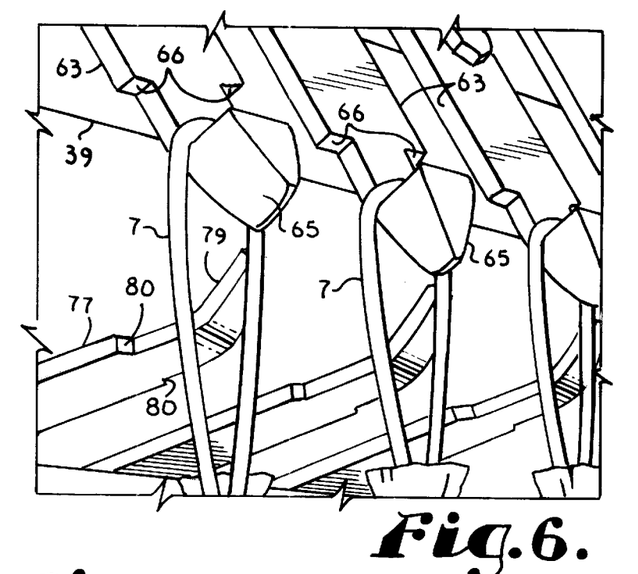
FIG. 6 is a perspective view of the unloader fingers and transfer conveyor fingers of the transfer station.

Referring to FIG. 5, the unloader shaft 39 is pivotally connected to a framework 61 and positioned transversely to and below the unload conveyor 37 such that as the racks 5 move along the conveyor 37 the unloader shaft 39 is spaced slightly below the hooks 8 and parallel to the crossbars 51. The unloader shaft 39 includes a number of unloader fingers 63 equal to the number of hooks 8 on one of the crossbars 51 of the racks 5 (twelve shown). The unloader fingers 63 extend outwardly from the unloader shaft 39 generally transversely to the shaft 39. As best seen in FIG. 6, each unloader finger 63 has a barb 65 on the distal end thereof and includes a pair of transverse shoulders 66 spaced rearwardly from the barb 65.

The unloader shaft 39 must be selectively rotated in multiple precise steps in order to perform the unloading function properly. While a variety of drive mechanisms, including stepper motors, could be employed to accomplish the stepping motion, the preferred embodiment employs two separate pneumatic drive mechanisms to pivot the unloader shaft 39. Referring to FIG. 7a, one of the two drive mechanisms is a linear actuator 67, such as a double-acting pneumatic cylinder, which is connected between the framework 61 and a mounting plate 68 having a lever arm 69 extending radially outwardly therefrom which is attached to the unloader shaft 39. The linear actuator 67 has a fixed stroke which pivots the unloader shaft 39 through a fixed angle of rotation upon air being supplied to the actuator 67. The other drive mechanism is a rotary actuator 70, such as a pneumatic rotary actuator, fixedly mounted on the mounting plate 68 and operatively connected to an end of the unloader shaft 39. An acceptable rotary actuator 70 is the Pneu-Turn® Model PT-494180-A1KMRS manufactured by the Bimba Manufacturing Co. of Monee, Ill. This rotary actuator 70 employs a pair of pneumatically operated racks 71 which engage a pinion gear 73 connected to the unloader shaft 39 to rotate the shaft 39 through an angle of rotation of up to 180 degrees. Activation of both the linear actuator 67 and rotary actuator 71 is controlled by the programable logic controller.

Referring again to FIG. 5, the transfer conveyor 41 is a chain type conveyor which runs in a generally triangular path, with a first or receiving leg 75 of the triangle being parallel to the unloader shaft 39. A plurality of conveyor fingers 77, each having an upturned tip 79 and a pair of shoulders 80 (see FIG. 6), extend outwardly from the transfer conveyor 41 such that the tips 79 of the conveyor fingers 77 along the first leg 75 are directly beneath the unloader shaft 39. The spacing between consecutive conveyor fingers 77 along the transfer conveyor 41 is equal to the spacing between the unloader fingers 63 along the unloader shaft 39. The first leg 75 of the transfer conveyor 41 is spaced below the unloader shaft 39 such that the distal ends of the unloader fingers 63 pivot into close relation with the tips 79 of the conveyor fingers 77 when the unloader shaft 39 is pivoted downwardly.

An apex 81 of the triangular transfer conveyor 41 generally opposite the first leg 75 thereof is positioned in close proximity to the main overhead conveyor 21 such that conveyor hooks 83 carried by the main conveyor 21 advance below the conveyor fingers 77. A ramp plate 85 is attached to the conveyor 41 at the apex 81 and includes an inclined edge positioned to engages the string loops 7 of the sausages 3 suspended from the conveyor fingers 77 as the sausages 3 reach the apex 81 and urge the string loops 7 off of the respective conveyor fingers 77 and onto the main conveyor hooks 83.

In use, a rack 5 loaded with sausages 3 is placed on the roller conveyor 35 by the forklift and rolls down the roller conveyor 35 until it reaches the pneumatically operated stop 59. The rack 5 remains against the stop 59 until the stop 59 is released, at which time the rack 5 rolls onto the unload conveyor 37 which carries the rack 5 through the transfer station 19.

Figure 7:
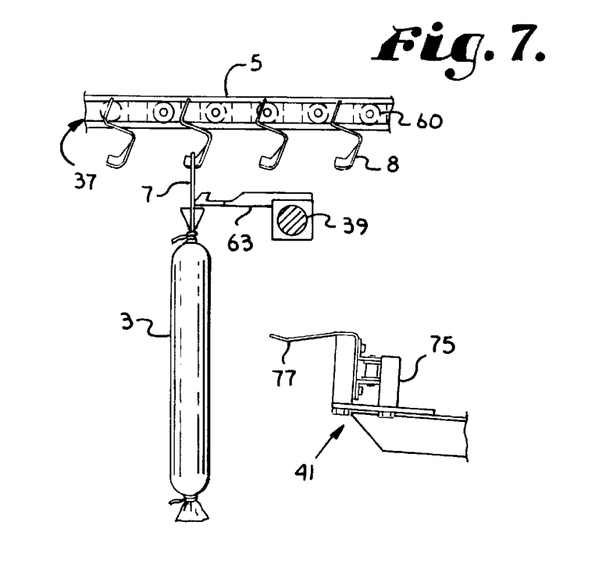
FIG. 7 is a partial side view of the automated pepperoni transfer station taken generally along line 7—7 in FIG. 5 and showing an unloader finger in the initial or first position.
Figure 7A:
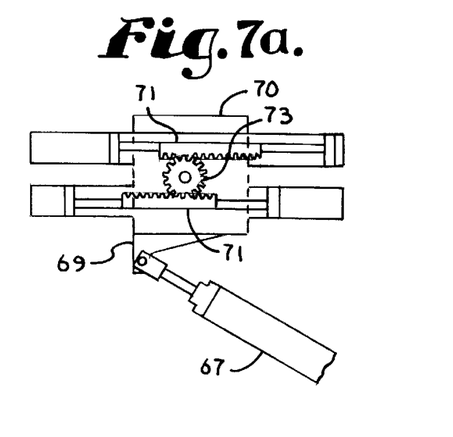
FIG. 7a is a partially schematic side view of the of the unloader drive mechanism in a position corresponding to FIG. 7.
Figure 8:
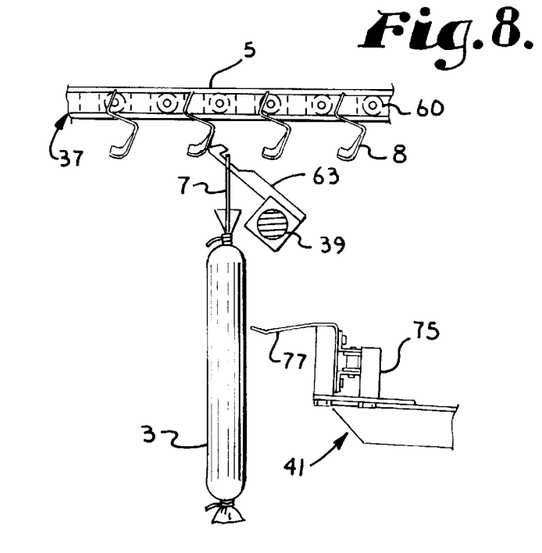
FIG. 8 is a partial side view of the automated pepperoni transfer station showing an unloader finger in the second position.
Figure 8A:
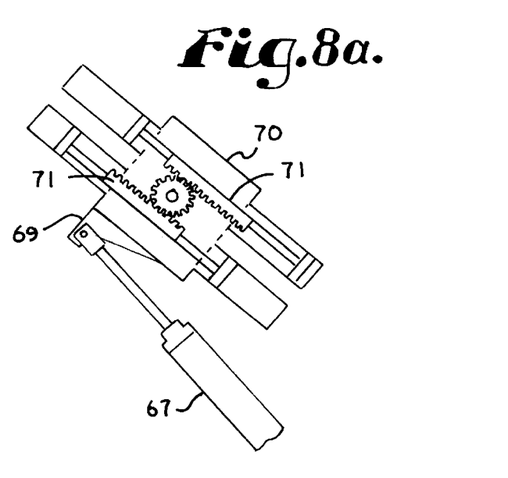
FIG. 8a is a partially schematic side view of the of the unloader drive mechanism in a position corresponding to FIG. 8.

Referring to FIGS. 7 and 7a, as a row of sausages 3 spaced along a crossbar 51 of a rack 5 approaches the unloader shaft 39, the unloader fingers 63 are oriented generally horizontally, in a first position, with the barb 65 pointed upward. It is to be understood that the unloader fingers 63 may be angled upward slightly in the first position so that the fingers 36 enter the loops 7 at their widest points, proximate the bottom of the rack hooks 8. The rack 5 advances forward, pulling the string loop 7 of each sausage 3 in the row over a respective unloader finger 63 such that the unloader fingers 63 extend through the loops 7. The shoulders 66 of the unloader fingers 63 engage the string loops 7 to keep the loops 7 from sliding up the unloader fingers 63 and to push the loops 7 off of the hooks 8 as the rack 5 continues to advance forward. Simultaneously with the forward advancement of the rack 5, the programable logic controller changes the condition of a pneumatic valve (not shown) allowing air to enter the rear of the cylinder of the linear actuator 67, driving the rod outward to an extended position, as seen in FIG. 8a. Extension of the linear actuator 67 causes the unloader shaft 39 and unloader fingers 63 to pivot upwardly approximately forty degrees to a second position (as shown in FIG. 8), and allows the unloader fingers 63 to push the sausages 3 in the row off of the hooks 8 of the rack 5 and to catch the ends of the loops 7 as they are pushed off of the hooks 8. The ends of the hooks 8 are preferably sloped or shaped to permit the string loops 7 to be pushed off of the hooks 8 without excessive resistance.

Figures 9, 9A:
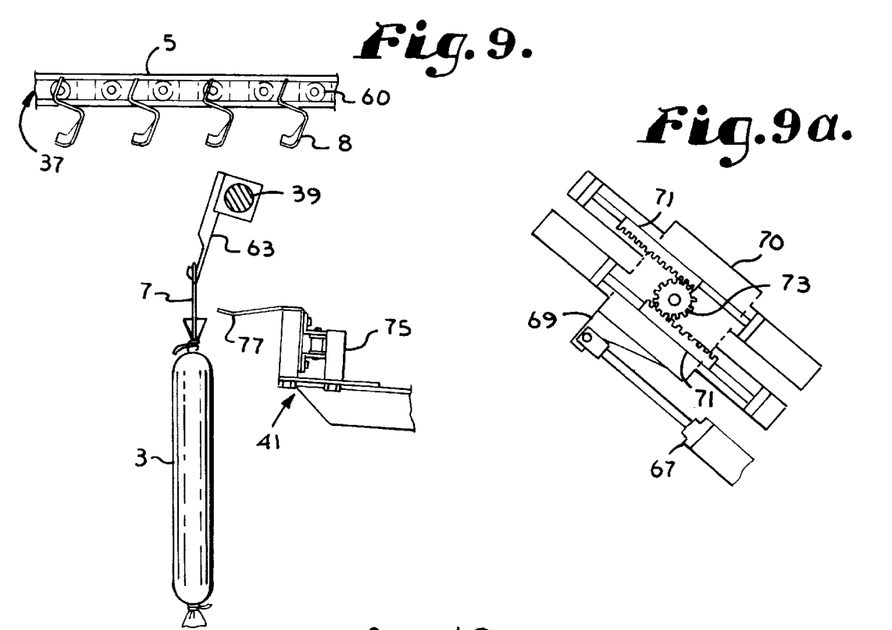
FIG. 9 is a partial side view of the automated pepperoni transfer station showing an unloader finger in the third position.
FIG. 9a is a partially schematic side view of the of the unloader drive mechanism in a position corresponding to FIG. 9.

Referring to FIGS. 9 and 9a, after the sausages are transferred to the unloader fingers 63, the rotary actuator 70 pivots the unloader shaft 39 and unloader fingers 63 downwardly about one hundred and thirty five degrees to a third position, leaving the unloader fingers 63 generally vertical and the sausages 3 hanging from the barbs 65 of the unloader fingers 63. The unloader shaft 39 stays in this position for a time period which is at least as long as is necessary for the sausages 3 from the previous row to clear the first leg 75 of the transfer conveyor 41. During this time period the programable logic controller is counting the conveyor fingers 77. Production volume on the processing line 1 is controlled by skipping fingers 77 on the transfer conveyor 41 between transfers of rows of sausages 3.

Figure 10:
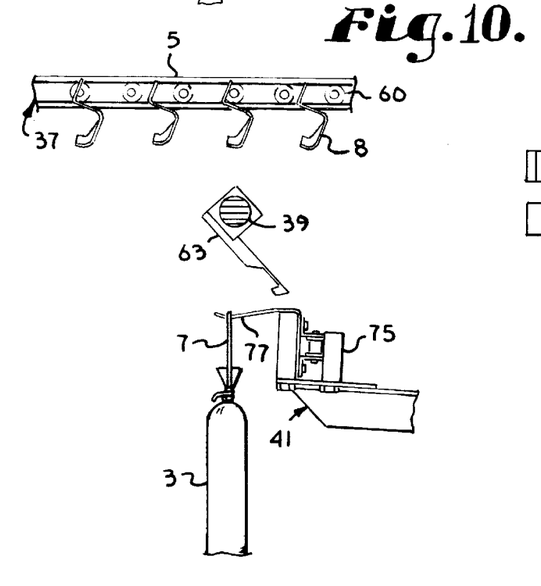
FIG. 10 is a partial side view of the automated pepperoni transfer station showing an unloader finger in the fourth position.
Figure 10A:
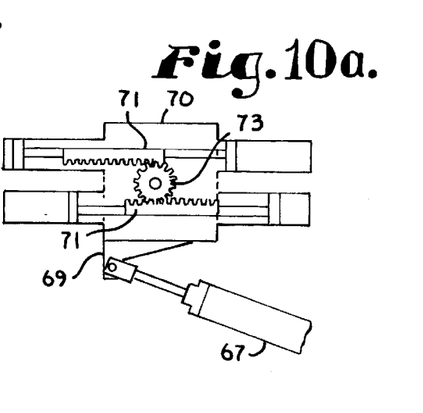
FIG. 10a is a partially schematic side view of the of the unloader drive mechanism in a position corresponding to FIG. 10.

After the desired number of conveyor fingers 77 have passed, the controller changes the condition of the pneumatic valve (not shown) causing the cylinder 67 to retract (as shown in FIG. 10a), pivoting the unloader shaft 39 and the unloader fingers 63 rearwardly approximately forty degrees to a fourth position, as seen in FIG. 10. As the unloader fingers 63 move over or proximate the conveyor fingers 77, the conveyor fingers 77 engage the string loops 7 and pull the sausages 3 onto the conveyor fingers 22. During the transfer process, the string loops 7 are momentarily stretched taut between the fingers 63 and 77 such that the string loops 7 are released with some force when they come off of the unloader fingers 63. The force produced pushes the string loops 7 up the respective conveyor fingers 77 until they engage the shoulders 80 thereof. After the row of sausages 3 has been transferred to the transfer conveyor 41, the rotary actuator 70 pivots the unloader shaft 39 and unloader fingers 63 back to the first position (see FIG. 7) in preparation for unloading the next row of sausages 3.

As an alternative to the string loops 7 being engaged and pulled off of the unloader fingers 63 by the conveyor fingers 77, the string loops 7 could simply be allowed to slide off of the unloader fingers 63 such that the sausages 3 drop under their own weight. If properly timed, the string loops 7 could then be caught by the conveyor fingers 77.

Referring to FIG. 3, the sausages 3 travel along the transfer conveyor 41 until they reach the apex 81 of the conveyor 41 proximate the main conveyor 21. At the apex 81, the string loops 7 are advanced or drawn across the inclined edge of the ramp plate 85 and are thereby pushed off of the respective conveyor fingers 77. As the sausages 3 drop off of the conveyor fingers 77 the string loops 7 are captured on the hooks 83 of the main conveyor 21 positioned therebelow. Once on the main conveyor 21, the sausages 3 move on toward the casing disengaging station 23.

After all of the sausages 3 are unloaded from the rack 5, it is carried past the transfer station 19 by the unload conveyor 37 to a washing station (not shown) where it is cleaned for reuse.

It is to be understood that while certain forms of the present invention have been illustrated and described herein, it is not to be limited to the specific forms or arrangement of parts described and shown. It is also to be understood that while the transfer station 19 described and depicted herein is primarily intended for use in transferring pepperoni sausages 3 from a rack 5 to a main conveyor 21, it is foreseen that the transfer station 19 is easily adaptable for use with hanging articles other than sausages 3 which need to be transferred from a rack to a conveyor, and these other uses are considered to be within the scope of the present invention. Further, it is to be understood that the angles through which the unloader fingers 63 rotate may be varied while still accomplishing the same general motion.

It is also foreseen that the unloader shaft 39 could be used to place hanging articles directly on a main conveyor 21 without the use of a transfer conveyor 41. Furthermore, the transfer station 19 could also be used to transfer the hanging articles into a bin or other container instead of placing them on a conveyor 21.

What is claimed and desired to be secured by Letters Patent is as follows:

1. A transfer station for removing articles from a rack, the articles being initially suspended from the rack in a plurality of rows, each article in each row being connected to the rack by a respective loop attached to the article and entrained over a rack hook depending from the rack, said transfer station comprising:
   a) an unload conveyor advancing the rack forward through said transfer station along an unload conveyor path; and
   b) a plurality of unloader fingers at least equal in number to the number of articles in each row, said unloader fingers being mounted to a selectively pivotable unloader shaft oriented transversely to said unload conveyor path and parallel to said rows of articles; wherein
   c) as the rack advances forward, said unloader fingers enter the loops of a row of articles and simultaneously with said forward advancement said unloader shaft is pivoted upwardly, a portion of said unloader fingers engaging the loops to push the loops and the row of articles suspended therefrom off of the rack hooks, such that the loops and the articles are transferred to said unloader fingers, said unloader shaft then pivoting downwardly until the loops slide off of said unloader fingers, causing the articles to drop.

2. The transfer station as in claim 1, and further including a transfer conveyor having a receiving leg positioned below said unloader shaft and running generally parallel thereto and including a plurality of conveyor fingers equally spaced with said unloader fingers, respective ones of said conveyor fingers catching the loops as the articles drop off of said unloader fingers.

3. The transfer station as in claim 2, wherein said transfer conveyor further includes an unloading portion including a plate having an outwardly angled edge positioned to engage the loops of articles suspended on said conveyor fingers and urge the loops off of said conveyor fingers, causing the articles to drop.

4. The transfer station as in claim 3, wherein said unloading portion is positioned in close proximity to a main conveyor having a plurality of main conveyor hooks depending therefrom, the main conveyor hooks catching the loops of the articles as they drop off of said conveyor fingers.

5. A transfer station for removing articles from a rack, the articles being initially suspended from the rack in a plurality of rows, each article in each row being connected to the rack by a respective loop attached to the article and entrained over a rack hook depending from the rack, said transfer station comprising:
   a) an unload conveyor advancing the rack forward through said transfer station along an unload conveyor path;

b) a plurality of unloader fingers at least equal in number to the number of articles in each row, said unloader fingers being mounted to a selectively pivotable unloader shaft oriented transversely to said unload conveyor path and parallel to said rows of articles; and c) a transfer conveyor having a receiving leg positioned below said unloader shaft and running generally parallel thereto and including a plurality of conveyor fingers equally spaced with said unloader fingers; wherein d) as the rack advances forward, said unloader fingers enter the loops of a row of articles and simultaneously with said forward advancement said unloader shaft is pivoted upwardly, a portion of said unloader fingers engaging the loops to push the articles in the row off of the rack hooks, such that the articles are transferred to said unloader fingers, said unloader shaft then pivoting downwardly until the loops are engaged by respective ones of said conveyor fingers along said receiving leg of said transfer conveyor and the articles are transferred to said conveyor fingers; and e) said transfer conveyor further includes an unloading portion including a plate having an outwardly angled edge positioned to engage the loops of articles suspended on said conveyor fingers and urge the loops off of said conveyor fingers, causing the articles to drop.

6. The transfer station as in claim 5, wherein said unloading portion is positioned in close proximity to a main conveyor having a plurality of main conveyor hooks depending therefrom, the main conveyor hooks catching the loops of the articles as they drop off of said conveyor fingers.

7. A transfer station for transferring articles from a rack to a first conveyor, the articles being initially suspended from the rack in a plurality of rows, each article in each row being connected to the rack by a respective loop attached to the article and entrained over a rack hook depending from the rack, said transfer station comprising:

a) an unload conveyor advancing the rack forward through said transfer station along an unload conveyor path; and b) a plurality of unloader fingers at least equal in number to the number of articles in each row, said unloader fingers being mounted to a selectively pivotable unloader shaft oriented transversely to said unload conveyor path and parallel to said rows of articles; wherein c) the first conveyor has a receiving leg positioned below said unloader shaft and running generally parallel thereto and includes a plurality of conveyor fingers equally spaced with said unloader fingers; and d) as the rack advances forward, said unloader fingers enter the loops of a row of articles and simultaneously with said forward advancement said unloader shaft is pivoted upwardly, a portion of said unloader fingers engaging the loops to push the loops and the row of articles suspended therefrom off of the rack hooks, such that the loops and the articles are transferred to said unloader fingers, said unloader shaft then pivoting downwardly until the loops are engaged by respective ones of the conveyor fingers along the receiving leg of the first conveyor and the articles are transferred to the conveyor fingers.

8. The transfer station as in claim 7, wherein each said unloader finger includes a barb proximate a distal end thereof, said barb acting to retain the loop of an article on said unloader finger as said unloader finger is pivoted downwardly into a generally vertical orientation.

9. The transfer station as in claim 7, and further including said first conveyor which is a transfer conveyor and includes an unloading portion thereof running in close proximity to a main conveyor having a plurality of main conveyor hooks, the articles being transferred from said conveyor fingers of said transfer conveyor to the main conveyor hooks when they reach said unloading portion of said transfer conveyor.

10. The transfer station as in claim 9, wherein said transfer conveyor runs in a generally triangular loop and said unloading portion is an apex of said generally triangular loop.

11. The transfer station as in claim 10, wherein said apex of said generally triangular loop is generally opposite said receiving leg.

12. The transfer station as in claim 10, and including a plate connected to said transfer conveyor proximate said apex, said plate having an outwardly angled edge positioned to engage opposed legs of the loops as the articles approach said apex and push said loops off of said conveyor fingers and onto the main conveyor hooks.

13. The transfer station as in claim 7, wherein said unloader shaft is selectively pivoted by first and second drive mechanisms, said first drive mechanism comprising a rotary actuator operatively connected to an end of said unloader shaft and said second drive mechanism comprising a linear actuator connected between a lever arm attached to said rotary actuator and a fixed frame member.

14. The transfer station as in claim 13, wherein:

a) said unloader shaft is initially positioned with said unloader fingers in a generally horizontal position;

b) upon extension of said linear actuator, said unloader shaft pivots in said first direction as the rack advances forward to push the row of articles off of the respective rack hooks;

c) upon rotation of said rotary actuator in said opposite direction, said unloader shaft pivots in said opposite direction to a position wherein said unloader fingers extend generally vertically downward and remains in said generally vertical position for a delay period;

d) upon retraction of said linear actuator after said delay period, said unloader shaft rotates further in said opposite direction to transfer said articles onto said conveyor fingers; and e) upon rotation of said rotary actuator in said first direction, said unloader shaft returns to said initial position.

15. A sausage transfer station for transferring sausages from a rack to a main conveyor having a plurality of main conveyor hooks, the sausages being initially suspended from the rack in a plurality of rows, each sausage in each row being connected to the rack by a respective loop attached to the sausage and entrained over a rack hook depending from the rack, said transfer station comprising:

a) an unload conveyor advancing the rack forward through said transfer station along an unload conveyor path;

b) a selectively pivotable unloader shaft having a number of unloader fingers at least equal to the number of sausages in each row, said unloader shaft being oriented transversely to said unload conveyor path and parallel to the rows of sausages; and c) a transfer conveyor having a receiving leg positioned below said unloader shaft and running generally parallel thereto, said transfer conveyor having a plurality of conveyor fingers equally spaced with said unloader fingers, an unloading portion of said transfer conveyor running in close proximity to the main conveyor; wherein:

d) as the rack advances forward, said unloader fingers enter the loops of a row of sausages and simultaneously with said forward advancement said unloader shaft is pivoted upwardly, a portion of said unloader fingers engaging the loops to push the sausages in the row off of the rack hooks, such that the sausages are transferred to said unloader fingers, said unloader shaft then pivoting downwardly until the loops are engaged by respective ones of said conveyor fingers along said receiving leg of said transfer conveyor and the articles are transferred to said conveyor fingers; and e) the sausages are transferred from said conveyor fingers of said transfer conveyor to the main conveyor hooks when they reach said unloading portion of said transfer conveyor.

16. The sausage transfer station as in claim 15, wherein each said unloader finger includes a barb proximate a distal end thereof, said barb acting to retain the loop of a sausage on said unloader finger as said unloader finger is pivoted downwardly into a generally vertical orientation.

17. The sausage transfer station as in claim 15, wherein said transfer conveyor runs in a generally triangular loop and said unloading portion is an apex of said generally triangular loop.

18. The sausage transfer station as in claim 17, wherein said apex of said generally triangular loop is generally opposite said receiving leg.

19. The sausage transfer station as in claim 18, and including a plate connected to said transfer conveyor proximate said apex, said plate having an outwardly angled edge positioned to engage the loops as the articles approach said apex and push said loops off of said conveyor fingers and onto the main conveyor hooks.

20. The sausage transfer station as in claim 15, wherein said unloader shaft is selectively pivoted by first and second drive mechanisms, said first drive mechanism comprising a rotary actuator operatively connected to an end of said unloader shaft and said second drive mechanism comprising a linear actuator connected between a lever arm attached to said rotary actuator and a fixed frame member.

21. The sausage transfer station as in claim 15, wherein:
   a) said unloader shaft is initially positioned with said unloader fingers in a generally horizontal position;
   b) upon extension of said linear actuator, said unloader shaft pivots in said first direction as the rack advances forward to push the row of sausages off of the respective rack hooks;
   c) upon rotation of said rotary actuator in said opposite direction, said unloader shaft pivots in said opposite direction to a position wherein said unloader fingers extend generally vertically downward and remain in said generally vertical position for a delay period;
   d) upon retraction of said linear actuator after said delay period, said unloader shaft rotates further in said opposite direction to transfer said sausages onto said conveyor fingers; and
   e) upon rotation of said rotary actuator in said first direction, said unloader shaft returns to said initial position.

22. A method of transferring sausages from a rack to a main conveyor having a plurality of main conveyor hooks, the sausages being initially suspended from the rack in a plurality of rows, each sausage in each row being connected to the rack by a respective loop of attached to the sausage and entwined over a rack hook depending from the rack, said method comprising the steps of:
   a) providing an unload conveyor for selectively advancing the rack forward along a path of said unload conveyor;
   b) providing a selectively pivotable unloader shaft having a number of unloader fingers equal to the number of sausages in each row, said unloader shaft being oriented transversely to said path of said unload conveyor and parallel to the rows of sausages, said unloader fingers initially positioned generally horizontally and in alignment with the loops of a row of sausages;
   c) providing a transfer conveyor having a leg positioned below said unloader shaft and running generally parallel thereto and an unloading portion running in close proximity to the main conveyor, said transfer conveyor having a plurality of conveyor fingers equally spaced with said unloader fingers;
   d) simultaneously advancing the rack forward on said unload conveyor and pivoting said unloader shaft in a first direction such that said unloader fingers enter and engage the loops to push the row of sausages off of the rack hooks, the loops becoming entrained around said unloader fingers;
   e) pivoting said unloader shaft in a direction opposite said first direction such that the loops move proximate respective ones of said conveyor fingers and are captured thereby;
   f) pivoting said unloader shaft in said first direction back to said initial position;
   g) moving the sausages along the transfer conveyor until they reach said unloading of said transfer conveyor;
   h) pushing said loops off of said conveyor fingers and onto the main conveyor hooks at said unloading portion; and
   i) repeating said simultaneously advancing and pivoting step through said pushing step for each successive row of sausages on the rack.

23. The method as in claim 22, wherein said unloader fingers each include a barb proximate a distal end thereof and said first pivoting step includes the steps of:
   a) pivoting said unloader shaft in said opposite direction until said unloader fingers extend generally vertically downward, the sausages positioned thereon hanging downwardly from said barbs;
   b) holding said unloader shaft with said unloader fingers extending generally vertically downward for a delay period; and
   c) pivoting said unloader shaft further in said opposite direction after said delay period until said loops are engaged by said conveyor fingers.

24. The method as in claim 23, wherein said delay period is measured by counting the number of conveyor fingers having passed since the preceding row of sausages was transferred onto said transfer conveyor.

* * * * *